(12) United States Patent
Kaneko

(10) Patent No.: US 12,553,784 B2
(45) Date of Patent: Feb. 17, 2026

(54) METHOD FOR CHECKING AN ASSEMBLY OF AT LEAST THREE STRAIN GAUGES AND STRAIN WAVE GEARING

(71) Applicant: Schaeffler Technologies AG & Co. KG, Herzogenaurach (DE)

(72) Inventor: Kazuaki Kaneko, Yokohama (JP)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 880 days.

(21) Appl. No.: 17/793,065

(22) PCT Filed: Dec. 2, 2020

(86) PCT No.: PCT/DE2020/101018
§ 371 (c)(1),
(2) Date: Jul. 15, 2022

(87) PCT Pub. No.: WO2021/148068
PCT Pub. Date: Jul. 29, 2021

(65) Prior Publication Data
US 2023/0037745 A1    Feb. 9, 2023

(30) Foreign Application Priority Data
Jan. 22, 2020 (DE) .................. 10 2020 101 424.4

(51) Int. Cl.
*G01L 3/10* (2006.01)
*F16H 49/00* (2006.01)
*G01L 25/00* (2006.01)

(52) U.S. Cl.
CPC ............ *G01L 3/108* (2013.01); *F16H 49/001* (2013.01); *G01L 25/003* (2013.01)

(58) Field of Classification Search
CPC ...... G01L 3/108; G01L 25/003; F16H 49/001
See application file for complete search history.

(56) References Cited

U.S. PATENT DOCUMENTS 6,840,118 B2    1/2005  Godler et al.
2004/0079174 A1  4/2004  Horiuchi
(Continued)

FOREIGN PATENT DOCUMENTS

CN    105571691 A    5/2016
CN    105698992 A    6/2016
(Continued)

OTHER PUBLICATIONS

DE-102014210379-A1_translated (Year: 2015).*
(Continued)

*Primary Examiner* — Lisa M Caputo
*Assistant Examiner* — Michael J Singletary
(74) *Attorney, Agent, or Firm* — Volpe Koenig

(57) ABSTRACT

An assembly includes at least three strain gauges and is attached to an elastic transmission element of a strain wave gearing. The assembly is designed to measure a torque acting on the elastic transmission element. Output signals from each of the strain gauges are measured. The output signal of one of the strain gauges is predicted from the measured output signals of the other strain gauges. An error message is output based on the predicted output signal deviating from the respective measured output signal by more than a predetermined tolerance.

18 Claims, 2 Drawing Sheets

(56) References Cited

U.S. PATENT DOCUMENTS

| | | | | |
|---|---|---|---|---|
| 2005/0100414 | A1* | 5/2005 | Salama | E21B 17/01 405/224.2 |
| 2017/0153156 | A1 | 6/2017 | Nitz et al. | |
| 2017/0211999 | A1 | 7/2017 | Bradford | |
| 2019/0346329 | A1* | 11/2019 | Suzuki | G01L 5/0042 |
| 2021/0354291 | A1* | 11/2021 | Heim | G01L 3/1457 |
| 2021/0372870 | A1* | 12/2021 | Nitz | G01B 7/18 |

FOREIGN PATENT DOCUMENTS

| | | | |
|---|---|---|---|
| DE | 10304607 A1 | 8/2004 | |
| DE | 102004041394 A1 | 4/2005 | |
| DE | 102013013634 A1 | 2/2015 | |
| DE | 102014210379 A1 * | 12/2015 | G01L 5/16 |
| DE | 102014210379 B4 | 3/2016 | |
| DE | 102018203251 A1 | 9/2019 | |
| DE | 102018125079 A1 | 4/2020 | |
| JP | S51009211 U | 1/1976 | |
| JP | S6159232 A | 3/1986 | |
| JP | S62216007 A | 9/1987 | |
| JP | H01270627 A | 10/1989 | |
| JP | 2000320622 A | 11/2000 | |
| JP | 2004198400 A | 7/2004 | |
| JP | 2004355330 A | 12/2004 | |
| JP | 2012127721 A | 7/2012 | |
| JP | 2014054978 A | 3/2014 | |
| JP | 2016045055 A | 4/2016 | |
| JP | 6320885 B2 | 5/2018 | |
| RU | 2615719 C1 | 4/2017 | |
| WO | 2009083111 A1 | 7/2009 | |
| WO | 2010142318 A1 | 12/2010 | |
| WO | 2019039156 A1 | 2/2019 | |

OTHER PUBLICATIONS

Source: Hashimoto, M et al.: „A joint torque sensing technique for robots with harmonic drives in Proceedings of IEEE International Conference on Robotics and Automation, vol. 2, pp. 1034-1039, Apr. 1991.

Source: M. Hashimoto, Y. Kiyosawa and R. P. Paul: "A Torque Sensing Technique for Robots with Harmonic Drives," IEEE Transaction on Robotics and Automation, vol. 9, No. 1, pp. 108-116, 1993.

Source: M. Hashimoto, T. Shimono and K. Koreyeda et al.: "Experimental Study on Torque Control Using Harmonic Drive Built-in Torque Sensors," IEEE International Conference on Robotics and Automation, Nice, pp. 2026-2031, 1992.

* cited by examiner $(Pk0 - T) < K0 < (Pk0 + T)$
$(Pk1 - T) < K1 < (Pk1 + T)$
$(Pk2 - T) < K2 < (Pk2 + T)$
$(Pk3 - T) < K3 < (Pk3 + T)$

METHOD FOR CHECKING AN ASSEMBLY OF AT LEAST THREE STRAIN GAUGES AND STRAIN WAVE GEARING

CROSS-REFERENCE TO RELATED APPLICATIONS

This application is the U.S. National Phase of PCT Appln. No. PCT/DE2020/101018 filed Dec. 2, 2020, which claims priority to DE 102020101424.4 filed Jan. 22, 2020, the entire disclosures of which are incorporated by reference herein.

TECHNICAL FIELD

The present disclosure relates to a method for checking an assembly of at least three strain gauges. The assembly comprising the strain gauges is attached to an elastic transmission element of a strain wave gearing and is designed to measure a torque acting on the elastic transmission element. Strain wave gearings of this type are also known as a harmonic gearing or harmonic drive. The elastic transmission element is also referred to as a flex spline and has an outer toothing. The strain gauges are placed on the elastic transmission element to measure a mechanical stress of the elastic transmission element and to determine from this the torque acting on the elastic transmission element. The disclosure also relates to a strain wave gearing.

BACKGROUND

The article by Hashimoto, M. et al.: "A joint torque sensing technique for robots with harmonic drives" in Proceedings of IEEE International Conference on Robotics and Automation, Issue 2, pages 1034-1039, April 1991 and the article by Hashimoto, M.; Kiyosawa, Y. and Paul, R. P.: "A Torque Sensing Technique for Robots with Harmonic Drives" in IEEE Transactions on Robotics and Automation, Issue 9, no. 1, pages 108-116, 1993 describe a method for measuring a torque in a strain wave gearing. Stain gauges that are arranged on an elastic transmission element of the strain wave gearing are used for measurement.

The further articles by Hashimoto, M. et al.: "A Torque Sensing Technique for Robots with Harmonic Drives" in IEEE Transactions on Robotics and Automation, Issue 9, no. 1, pages 108-116, 1993 and by Hashimoto, M.; Shimono, T.; Koreyeda, K. et al.: "Experimental Study on Torque Control Using Harmonic Drive Built-in Torque Sensors," in IEEE International Conference on Robotics and Automation, Nice, pages 2026-2031, 1992 describe a method for measuring a torque in a strain wave gearing, in which a disturbance torque reduction takes place by means of implemented forward compensations.

DE 10 2004 041 394 A1 discloses a wave gear device with a torque detection mechanism which comprises a plurality of strain gauges with resistance wire regions on a flexible outer gearwheel, which are electrically connected via conducting wires.

JP 2000320622 A discloses a wave gear having a torque sensor mechanism, which comprises a strain gauge, on a flexible outer gearwheel, which is electrically connected via conducting wires.

US 2004/0079174 A1 teaches a torque detection device for a wave gear comprising a strain gauge unit which has a strain gauge pattern. The strain gauge pattern comprises arc-shaped detection segments A and B and three terminal portions for external wiring, one of which is formed between the detection segments and the others of which are formed at the opposite ends thereof.

JP2016-045055 A discloses the use of a Wheatstone bridge with strain gauges on a rotating shaft of a wave gear.

U.S. Pat. No. 6,840,118 B2 discloses a torque-measuring method for measuring a torque transmitted in a wave gear device. In the wave gear device, a flexible, circular outer gearwheel partially meshes with a rigid inner gearwheel. A plurality of strain sensor sets is attached to the surface of the flexible outer gearwheel.

CN 105698992 A relates to a high-precision wave gear having a built-in torque sensor. The torque sensor comprises, inter alia, a Wheatstone half-bridge.

RU 2 615 719 C1 teaches a wave gear which is designed to measure a torque.

WO 2010/142318 A1 discloses a device for measuring a torque in a wave gear. The device comprises at least one sensor for measuring forces between an outer ring with inner toothing and a housing.

JP 6320885 B2 describes a torque detection element which comprises a plurality of strain gauges that form a Wheatstone bridge. The strain gauges are arranged in the form of a pattern-like metallic film on a surface of a flexible film-like insulation.

Prediction models are used which determine the output torque of a strain wave gearing based on strain values from strain gauges. However, a defect in a strain gauge is not taken into account here, which in turn can lead to an incorrect and invalid value.

SUMMARY

It is desirable to be able to detect a defect in one of a plurality of strain gauges on an elastic transmission element of a strain wave gearing with little effort.

The method according to one exemplary embodiment of the present disclosure is to check an assembly of at least three strain gauges. The assembly comprising the strain gauges is applied to an elastic transmission element of a strain wave gearing. The elastic transmission element forms a torque-transmitting component of the strain wave gearing. The strain wave gearing can also be referred to as harmonic drive or harmonic gearing. The elastic transmission element can also be referred to as a flex spline and may be formed by a flanged bushing. The elastic transmission element may be designed to derive a torque to be transmitted by the strain wave gearing.

The elastic transmission element may have an outer toothing, which is designed to engage an inner toothing of a rigid outer ring of the strain wave gearing. The outer toothing and the inner toothing differ in a number of respective teeth—the difference being two, for example. The strain wave gearing according to the disclosure may have a wave generator which comprises an elliptical disk and a deformable raceway. The elliptical disk may be made of steel and may form a drive for the strain wave gearing.

The assembly of at least three strain gauges applied to the elastic transmission element is designed to measure a mechanical stress of the elastic transmission element. This assembly of the strain gauges is further designed in such a way that it detects a torque acting on the elastic transmission element of the strain wave gearing.

The method according to the disclosure comprises several steps. First, the output signals of the individual strain gauges are measured. In particular, the output signals can be measured as a change in resistance or change in voltage at the respective strain gauge. The output signals may be measured simultaneously or at least within a period of time in which the torque acting on the elastic transmission element does not change. Then the output signal of at least one of the strain gauges is predicted from the measured output signals of the other strain gauges. Thus, the output signal of at least one of the strain gauges is both measured and predicted. However, the measured output signals of the remaining strain gauges are used for the prediction.

If the predicted output signal or at least one of the predicted output signals deviates from the respective measured output signal by more than a predetermined tolerance, this is regarded as an error in the assembly comprising the multiple strain gauges and an error message is output.

Advantageously, the method according to the present disclosure does not require further sensors for error monitoring in the assembly comprising the at least three strain gauges. In this sense, a self-examination of this assembly takes place. In particular, a failure of one of the strain gauges can be detected if it is torn, for example. According to the present disclosure, this check is carried out with the other strain gauges of the assembly.

The assembly may comprise at least four of the strain gauges. The assembly may include a multiple of four of the strain gauges. The strain gauges are arranged on the elastic transmission element. The four strain gauges may form a Wheatstone bridge through a corresponding electrical interconnection, wherein it also being possible for the interconnection to be in the form of a half bridge or a full bridge.

In embodiments of the method according to the present disclosure, the output signals of all of the strain gauges are predicted from the measured output signals of the other strain gauges. Thus, for each of the strain gauges, the output signal thereof is predicted and also measured. The measured output signal and the predicted output signal are therefore provided for each of the strain gauges. The number of predictions corresponds to the number N of strain gauges that are arranged on the elastic transmission element.

In embodiments of the method according to the present disclosure, the output signals of the strain gauges are respectively predicted from the measured output signals of all of the other strain gauges. Thus, each of the predictions is based on N−1 measured outputs.

In embodiments of the method according to the present disclosure, the predetermined tolerance is selected as a function of a rotational speed of the elastic transmission element. The torque acting on the elastic transmission element has fluctuations or a ripple, which depends on the rotational speed of the elastic transmission element. Accordingly, a degree of tolerance is preferably chosen as a function of the rotational speed of the elastic transmission element. The tolerance may also be determined by a calibration.

The method may be designed to carry out a measurement of the torque acting on the elastic transmission element in addition to checking the strain gauges. For this purpose, the torque acting on the elastic transmission element is determined or predicted from the measured output signals of the individual strain gauges, provided that all of the predicted output signals do not deviate from the respective measured output signal by more than the predetermined tolerance, i.e., unless at least one of the predicted output signals deviates from the respective measured output signal by more than the predetermined tolerance, i.e., unless an error message was issued. In this respect, the strain gauges are used for their original function.

The stated condition that all of the predicted output signals do not deviate from the respective measured output signal by more than the predetermined tolerance or that at least one of the predicted output signals does not deviate from the respective measured output signal by more than the predetermined tolerance may be checked in that a conditional inequality is checked. The conditional inequality comprises an inequality to be checked as to whether a difference between the predicted output signal of the respective strain gauge and the predetermined tolerance is smaller than the measured output signal of the respective strain gauge. Additionally, the conditional inequality comprises an inequality to be checked as to whether the measured output signal of the respective strain gauge is smaller than a sum of the predicted output signal of the respective strain gauge and the predetermined tolerance.

The conditional inequality may be checked with a microcontroller.

An algorithm based on a mathematical prediction model may be used to predict the output signal of the respective strain gauge from the measured output signals of the remaining strain gauges and also to determine the torque acting on the elastic transmission element. The mathematical prediction model may be determined by a finite element analysis or by a machine learning method. The machine learning method may be formed by deep learning, by random forest and/or by support vector machines. Before the algorithm or algorithms for predicting the output signals and, if applicable, the algorithm for determining the torque are used, these may each be trained using a plurality of training data.

The strain wave gearing according to the present disclosure has an elastic transmission element. An assembly of at least three strain gauges is arranged on the elastic transmission element. The assembly comprising the at least three strain gauges is designed to measure a torque acting on the elastic transmission element. The strain wave gearing further comprises a measurement signal processing unit which is configured to carry out the method according to the present disclosure. The measurement signal processing unit may be configured to carry out one of the above-described embodiments of the method according to the present disclosure. In addition, the strain wave gearing may also have features that have been described in connection with the method according to the present disclosure.

The strain gauges may extend, at least in their entirety, along a circumference of the elastic transmission element. The circumference can be an axially arranged inner circumference or an axially laterally arranged circumference. The circumference can be arranged on an outer or inner lateral surface or on an axial lateral face of the elastic transmission element. The circumference surrounds at least one radially inner portion of the elastic transmission element. The strain gauges may extend, at least in their entirety, completely about and over this circumference of the elastic transmission element. The strain gauges, at least in their entirety, thus surround an axis of the elastic transmission element in which the elastic transmission element transmits a torque.

The strain gauges may each be formed as a coating directly on a metallic surface of the elastic transmission element. The coating is firmly applied to the metallic surface. The strain gauges are thus each arranged and fastened on the metallic surface of the elastic transmission element without an intermediate layer, in particular without an adhesive. There is a direct bond between the strain gauges and the metallic surface of the elastic transmission element. The strain-sensitive material of the strain gauges is arranged directly on the metallic surface of the elastic transmission element. The strain-sensitive material forms a direct coating on the metallic surface of the elastic transmission element.

The strain wave gearing according to the present disclosure may be designed to drive an arm element of a robot arm. In this respect, the strain wave gearing forms a component of a robot arm. The arm element is coupled via the strain wave gearing according to the present disclosure. However, the strain wave gearing according to the present disclosure can also be designed for applications outside of robotics.

BRIEF DESCRIPTION OF THE DRAWINGS

Additional advantages, details, and further developments of the present disclosure will become apparent from the below description of an exemplary embodiment, with reference to the drawing. In the figures.

DETAILED DESCRIPTION

Figure 1:
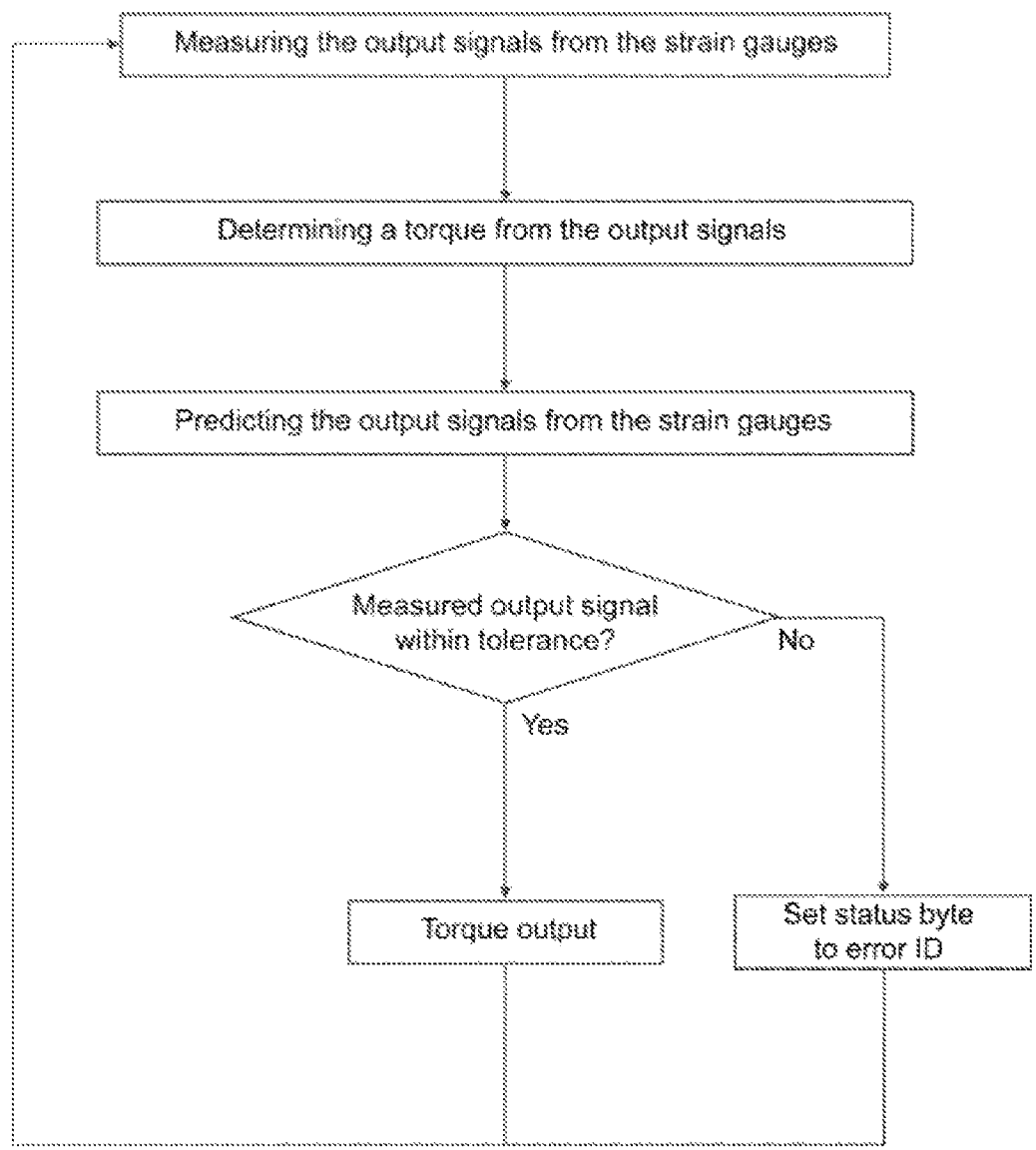
FIG. 1 shows a flowchart of an exemplary embodiment of a method according to the present disclosure.

FIG. 1 shows a flowchart of an exemplary embodiment of a method according to the present disclosure, which is used to check an assembly of at least three strain gauges (not shown). The assembly may comprise four of the strain gauges. The assembly, comprising the four strain gauges, is applied to an elastic transmission element (not shown) of a strain wave gearing (not shown). This embodiment of the method also allows a torque Mt acting on the elastic transmission element (not shown) to be measured. This measurement forms the original function of the assembly comprising the four strain gauges.

In a first step, output signals of all four strain gauges (not shown) are detected. For this purpose, output voltages from the strain gauges (not shown) are converted using an analog to digital (A/D) converter (not shown) and processed using a microcontroller. In the next step, the torque Mt acting on the elastic transmission element (not shown) is determined from all four measured output signals (shown in detail in FIG. 2). In a further step, output signals of the individual strain gauges (not shown) are predicted from the measured output signals of the other three strain gauges (not shown) (shown in detail in FIG. 2), so that the measured output signal and the predicted output signal are available for the strain gauges. In a next step, it is checked whether the four measured output signals are each within a tolerance range around the corresponding predicted output signal (shown in detail in FIG. 3). If this is not the case, there is an error in the strain gauges (not shown) and a status byte is set to an error identifier, which is 0xFF, for example. The error will usually be a failure or defect in one of the four strain gauges (not shown). If the four measured output signals are each in a tolerance range around the corresponding predicted output signal, there is no error in the strain gauges (not shown), such that the previously determined value of the torque Mt is output and used and the status byte is set to an OK identifier, which is 0x00, for example. The method is then repeated.

Figures 2, 3:
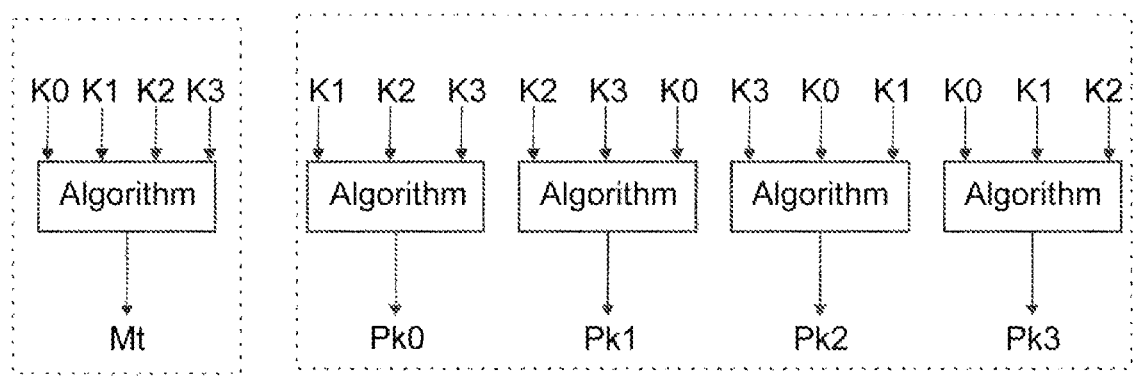
FIG. 2 shows two steps of the method shown in FIG. 1 in detail.
FIG. 3 shows a conditional inequality used in the method shown in FIG. 1.

FIG. 2 shows two steps of the method shown in FIG. 1 in detail. First, it is shown how the torque Mt acting on the elastic transmission element (not shown) is determined from the four measured output signals K0, K1, K2, K3. For this purpose, an algorithm is used which is based on a mathematical prediction model, which is determined, for example, by a finite element analysis or by a machine learning method. In the case of machine learning, the algorithm is trained using a plurality of training data before it is used. All of the measured output signals are used to determine the torque. It also shows how the predicted values Pk0, Pk1, Pk2, Pk3 of the output signals are determined from the four measured output signals K0, K1, K2, K3. For this purpose, in turn, an algorithm is used in each case, which is based on a mathematical prediction model, which is determined, for example, by a finite element analysis or by a machine learning method. In the case of machine learning, the algorithm(s) are each trained using multiple training data before they are used. The four predicted values Pk0, Pk1, Pk2, Pk3 of the output signals of the four strain gauges (not shown) are determined from the measured output signals K0, K1, K2, K3 of the other three strain gauges (not shown).

FIG. 3 shows a conditional inequality which is applied in the method shown in FIG. 1 in order to decide whether the four measured output signals K0, K1, K2, K3 are each within a tolerance range around the corresponding predicted output signal Pk0, Pk1, Pk2, Pk3. For each of the four strain gauges (not shown), it is checked whether the measured output value K0, K1, K2, K3 thereof is within the tolerance range around the value Pk0, Pk1, Pk2, Pk3 of the corresponding predicted output signal. A tolerance value T is predefined for this purpose, so that the tolerance range is ±T. Only when the inequality is satisfied for each of the four strain gauges (not shown) is it concluded that the assembly (not shown) comprising the strain gauges is in a fault-free state.

The invention claimed is:

1. A method for checking an assembly by measuring a torque acting on the assembly, the method comprising:
   providing the assembly with at least three strain gauges attached to an elastic transmission element of a strain wave gearing;
   measuring, by a microcontroller of the assembly, output signals from each of the strain gauges;
   predicting, by the microcontroller, the output signal from one of the strain gauges based on the measured output signals of the other strain gauges;
   selecting a predetermined tolerance based on a function of a rotational speed of the elastic transmission element; and
   outputting, by the microcontroller, an error message based on the predicted output signals deviating from the respective measured output signal by more than the predetermined tolerance.

2. The method according to claim 1, wherein the assembly includes at least four of the strain gauges.

3. The method according to claim 2, further comprising predicting the output signals from each of the strain gauges based on the measured output signals from the other strain gauges.

4. The method according to claim 1, further comprising predicting the output signals from each of the strain gauges based on the measured output signals from the other strain gauges.

5. The method according to claim 4, further comprising outputting the error message based on at least one of the predicted output signals deviating from the respective measured output signal by more than the predetermined tolerance.

6. The method according to claim 1, further comprising determining the torque acting on the elastic transmission element from the output signals of the strain gauges based on none of the predicted output signals deviating from the respective measured output signals by more than the predetermined tolerance.

7. The method according to claim 3, further comprising outputting the error message based on at least one of the predicted output signals deviating from the respective measured output signal by more than the predetermined tolerance.

8. The method according to claim 1, wherein the strain gauges extend around a circumference on a lateral surface or an axial side surface of the elastic transmission element.

9. The method according to claim 1, wherein the strain gauges are each formed as a coating directly on a metallic surface of the elastic transmission element.

10. A method for checking an assembly by measuring a torque acting on the assembly, the method comprising:
providing the assembly with at least three strain gauges attached to an elastic transmission element of a strain wave gearing;
measuring, by a microcontroller of the assembly, output signals from each of the strain gauges;
predicting, by the microcontroller, the output signal from one of the strain gauges from the measured output signals of the other strain gauges based on a mathematical prediction model, wherein the mathematical prediction model is determined by a finite element analysis or by a machine learning method; and
outputting, by the microcontroller, an error message based on the predicted output signals deviating from the respective measured output signal by more than the predetermined tolerance.

11. A strain wave gearing, comprising:
an elastic transmission element;
an assembly of at least three strain gauges, the assembly being applied to the elastic transmission element and being designed to measure a torque acting on the elastic transmission element; and
a microcontroller configured to:
measure output signals from each of the strain gauges;
predict the output signal from one of the strain gauges based on the measured output signals of the other strain gauges;

select a predetermined tolerance based on a function of a rotational speed of the elastic transmission element; and
output an error message based on the predicted output signal deviating from the respective measured output signal by more than the predetermined tolerance.

12. The strain wave gearing according to claim 11, wherein the strain gauges extend around a circumference on a lateral surface or an axial side surface of the elastic transmission element.

13. The strain wave gearing according to claim 11, wherein the strain gauges are each formed as a coating directly on a metallic surface of the elastic transmission element.

14. The strain wave gearing according to claim 11, wherein the microcontroller is further configured to output the error message based on at least one of the predicted output signals deviating from the respective measured output signal by more than the predetermined tolerance.

15. The strain wave gearing according to claim 11, wherein the microcontroller is further configured to determining the torque acting on the elastic transmission element from the output signals of the strain gauges based on none of the predicted output signals deviating from the respective measured output signals by more than the predetermined tolerance.

16. The strain wave gearing according to claim 11, wherein the microcontroller is further configured to predict the output signal of the strain gauge from the measured output signals of the other strain gauges based on a mathematical prediction model, wherein the mathematical prediction model is determined by a finite element analysis or by a machine learning method.

17. The strain wave gearing according to claim 11, wherein the assembly includes at least four of the strain gauges.

18. The strain wave gearing according to claim 17, wherein the microcontroller is further configured to output the error message based on at least one of the predicted output signals deviating from the respective measured output signal by more than the predetermined tolerance.

* * * * *